US009844995B2

(12) United States Patent
Rawlinson

(10) Patent No.: US 9,844,995 B2
(45) Date of Patent: Dec. 19, 2017

(54) EV MUTI-MODE THERMAL CONTROL SYSTEM

(71) Applicant: Atieva, Inc., Menlo Park, CA (US)

(72) Inventor: Peter Dore Rawlinson, Worcestershire (GB)

(73) Assignee: ATIEVA, INC., Menlo Park, CA (US)

(*) Notice: Subject to any disclaimer, the term of this patent is extended or adjusted under 35 U.S.C. 154(b) by 296 days.

(21) Appl. No.: 14/698,630

(22) Filed: Apr. 28, 2015

(65) Prior Publication Data
US 2016/0318370 A1 Nov. 3, 2016

Related U.S. Application Data

(63) Continuation-in-part of application No. 14/698,394, filed on Apr. 28, 2015.

(51) Int. Cl.
B60K 11/00 (2006.01)
B60H 1/00 (2006.01)
B60L 1/00 (2006.01)
B60L 1/06 (2006.01)
B60L 3/00 (2006.01)
(Continued)

(52) U.S. Cl.
CPC ....... B60H 1/00278 (2013.01); B60H 1/2221 (2013.01); B60H 1/3211 (2013.01); B60L 1/003 (2013.01); B60L 1/06 (2013.01); B60L 3/003 (2013.01); B60L 3/0061 (2013.01); B60L 11/1803 (2013.01); B60L 11/1874 (2013.01); B60L 11/1875 (2013.01); B60H 2001/00307 (2013.01); B60L 2240/12 (2013.01); B60L 2240/34 (2013.01); B60L 2240/36 (2013.01); B60L 2240/425 (2013.01); B60L 2240/525 (2013.01); B60L 2240/545 (2013.01); B60L 2240/662 (2013.01); Y02T 10/7005 (2013.01);
(Continued)

(58) Field of Classification Search
CPC .... B60L 1/003; B60L 1/02; B60L 1/06; B60L 3/003; B60L 3/0046; B60L 3/0061; B60L 3/0084; B60L 11/1874; B60L 11/1803; B60L 11/1875; B60L 2240/36; B60L 2240/12; B60L 2240/545; B60L 2240/34; B60L 2240/425; B60L 2240/525; B60L 2240/662; B60H 1/2221; B60H 1/3211; B60H 1/00278; B60H 1/00885; B60H 1/00571; B60H 2001/00307; B60K 11/02; Y02T 10/7005; Y02T 90/16
See application file for complete search history.

(56) References Cited

U.S. PATENT DOCUMENTS 8,336,319 B2 12/2012 Johnston
8,875,820 B2 11/2014 Yamashita
(Continued)

FOREIGN PATENT DOCUMENTS

CA 2943304 9/2015
DE 102013212837 1/2014

Primary Examiner — James A Shriver, II
Assistant Examiner — Steve Clemmons
(74) Attorney, Agent, or Firm — Patent Law Office of David G. Beck

(57) ABSTRACT

A thermal management system that utilizes a multi-mode valve assembly within the drive train control loop to provide efficient thermal control of the drive train components is provided. The multi-mode valve assembly allows the mode of thermal coupling between the thermal control loop and the various drive train components (e.g., vehicle propulsion motor, gearbox assembly, power electronics subsystem, etc.) to be varied in accordance with present conditions.

20 Claims, 13 Drawing Sheets

(51) Int. Cl.
*B60L 11/18* (2006.01)
*B60H 1/22* (2006.01)
*B60H 1/32* (2006.01)

(52) U.S. Cl.
CPC .......... *Y02T 10/705* (2013.01); *Y02T 10/7291* (2013.01); *Y02T 90/16* (2013.01)

(56) References Cited

U.S. PATENT DOCUMENTS

| | | |
|---|---|---|
| 9,096,207 B2 | 8/2015 | Madurai Kumar |
| 2004/0000161 A1 | 1/2004 | Khelifa |
| 2009/0188450 A1 | 7/2009 | Kline |
| 2013/0285486 A1 | 10/2013 | Imanishi |
| 2016/0167481 A1 | 6/2016 | Makihara |
| 2016/0229282 A1 | 8/2016 | Hettrich |

EV MUTI-MODE THERMAL CONTROL SYSTEM

CROSS-REFERENCE TO RELATED APPLICATION

This application is a continuation-in-part of U.S. patent application Ser. No. 14/698,394, filed 28 Apr. 2015, the disclosure of which is incorporated herein by reference for any and all purposes.

FIELD OF THE INVENTION

The present invention relates generally to the electric motor assembly of an electric vehicle and, more particularly, to a cooling system that can be used to effectively and efficiently cool the motor assembly and related drive train components of an electric vehicle.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, safety and cost.

The most common approach to achieving a low emission, high efficiency car is through the use of a hybrid drive train in which an internal combustion engine (ICE) is combined with one or more electric motors. While hybrid vehicles provide improved gas mileage and lower vehicle emissions than a conventional ICE-based vehicle, due to their inclusion of an internal combustion engine they still emit harmful pollution, albeit at a reduced level compared to a conventional vehicle. Additionally, due to the inclusion of both an internal combustion engine and an electric motor(s) with its accompanying battery pack, the drive train of a hybrid vehicle is typically much more complex than that of either a conventional ICE-based vehicle or an all-electric vehicle, resulting in increased cost and weight. Accordingly, several vehicle manufacturers are designing vehicles that only utilize an electric motor, or multiple electric motors, thereby eliminating one source of pollution while significantly reducing drive train complexity.

In order to achieve the desired levels of performance and reliability in an electric vehicle, it is critical that the temperatures of the traction motor, related power electronics and battery pack each remain within its respective operating temperature range regardless of ambient conditions or how hard the vehicle is being driven. Furthermore, in addition to controlling battery and drive train temperatures, the thermal management system must also be capable of heating and cooling the passenger cabin while not unduly affecting the vehicle's overall operating efficiency.

A variety of approaches have been used to try and meet these goals. For example, U.S. Pat. No. 6,360,835 discloses a thermal management system for use with a fuel-cell-powered vehicle, the system utilizing both low and high temperature heat transfer circuits that share a common heat transfer medium, the dual circuits required to adequately cool the vehicle's exothermic components and heat the vehicle's endothermic components.

U.S. Pat. No. 7,789,176 discloses a thermal management system that utilizes multiple cooling loops and a single heat exchanger. In an exemplary embodiment, one cooling loop is used to cool the energy storage system, a second cooling loop corresponds to the HVAC subsystem, and a third cooling loop corresponds to the drive motor cooling system. The use of a heater coupled to the first cooling loop is also disclosed, the heater providing a means for insuring that the batteries are warm enough during initial vehicle operation or when exposed to very low ambient temperatures.

U.S. Pat. No. 8,336,319 discloses an EV dual mode thermal management system designed to optimize efficiency between two coolant loops, the first cooling loop in thermal communication with the vehicle's batteries and the second cooling loop in thermal communication with at least one drive train component such as an electric motor or an inverter. The disclosed system uses a dual mode valve system to configure the thermal management system between a first mode and a second mode of operation, where in the first mode the two cooling loops operate in parallel and in the second mode the two cooling loops operate in series.

Although the prior art discloses numerous techniques for maintaining the temperature of the battery pack, an improved thermal management system is needed that efficiently controls the temperature of not only the vehicle's battery pack, but also that of the electric motor and related drive train components. The present invention provides such a thermal management system.

SUMMARY OF THE INVENTION

The present invention provides a thermal management system that utilizes a multi-mode valve assembly within the drive train control loop to provide efficient thermal control of the drive train components. The system includes (i) a drive train thermal control loop comprising a first circulation pump that circulates a heat transfer fluid within the control loop, where the control loop is thermally coupled to a primary drive train component (e.g., vehicle propulsion motor, gearbox assembly or a power electronics subsystem such as a power inverter) and to a secondary drive train component (e.g., vehicle propulsion motor, gearbox assembly or a power electronics subsystem such as a power inverter); (ii) a first valve assembly coupled to the drive train thermal control loop; and (iii) a second valve assembly coupled to the drive train thermal control loop. When the first valve assembly is in a first operational mode, the drive train thermal control loop is thermally coupled to the primary drive train component and to the secondary drive train component in series such that the drive train thermal control loop is thermally coupled first to the primary drive train component and second to the secondary drive train component. When the first valve assembly is in a second operational mode, the drive train thermal control loop is thermally coupled to the secondary drive train component and to the primary drive train component in series such that the drive train thermal control loop is thermally coupled first to the secondary drive train component and second to the primary drive train component. The drive train thermal control loop is thermally coupled first to the primary drive train component and second to the secondary drive train component when the first valve assembly is in the first operational mode and the second valve assembly is in the third operational mode. The drive train thermal control loop is decoupled from the primary drive train component and allows the heat transfer fluid to by-pass the primary drive train component while thermally coupling the drive train thermal control loop to the secondary drive train component when the first valve assembly is in the first operational mode and the second valve assembly in the fourth operational mode.

The second valve assembly may include a fifth operational mode which, when the first valve assembly is in the first operational mode and the second valve is in the fifth operational mode allows a first portion of the heat transfer fluid to be thermally coupled to the primary drive train component and to the secondary drive train component in series, while allowing a second portion of the heat transfer fluid to by-pass the primary drive train component and to only be thermally coupled to the secondary drive train component.

The system may further include a third valve assembly coupled to the drive train thermal control loop which, when the first valve assembly is in the second operational mode and the third valve is in the sixth operational mode, thermally couples the drive train thermal control loop first to the secondary drive train component and second to the primary drive train component. When the first valve assembly is in the second operational mode and the third valve is in the seventh operational mode, the drive train thermal control loop is decoupled from the secondary drive train component and the heat transfer fluid is allowed to by-pass the secondary drive train component while thermally coupling the drive train thermal control loop to the primary drive train component. When the first valve assembly is in the second operational mode and the second valve is in the eighth operational mode, the system allows a first portion of the heat transfer fluid to be thermally coupled to the secondary drive train component and to the primary drive train component in series, while allowing a second portion of the heat transfer fluid to by-pass the secondary drive train component and to only be thermally coupled to the primary drive train component.

In another aspect, the heat transfer fluid may consist of water or water containing an additive (e.g., ethylene glycol, propylene glycol, etc.).

In another aspect, the system may include a coolant reservoir, where the heat transfer fluid within the drive train thermal control loop flows into and out of the coolant reservoir.

In another aspect, the system may include a radiator coupled to the drive train thermal control loop. A fan may be configured to force air through the radiator. The system may include a diverter valve, where the diverter valve in a first position couples the radiator to the drive train thermal control loop and allows at least a portion of the heat transfer fluid to flow through the radiator, and where the diverter valve in a second position decouples the radiator from the drive train thermal control loop and allows the heat transfer fluid within the drive train thermal loop to bypass the radiator. In the first position, the diverter valve may be configured to allow a second portion of the heat transfer fluid to bypass the radiator. In a third position, the diverter valve may be configured to couple the radiator to the drive train thermal loop and allow the heat transfer fluid to flow through the radiator while preventing the second portion of the heat transfer fluid from bypassing the radiator.

In another aspect, the system may include (i) a battery thermal control loop comprising a second circulation pump that circulates the heat transfer fluid within the battery thermal control loop, where the battery thermal control loop is thermally coupled to a vehicle battery pack; and (ii) a fourth valve assembly, where the battery thermal control loop operates in parallel with and independent of the drive train thermal control loop when the fourth valve assembly is configured in a fourth valve assembly first mode, and where the battery thermal control loop is serially coupled to the drive train thermal control loop when the second valve assembly is configured in a fourth valve assembly second mode. The vehicle battery pack may include a plurality of batteries and a plurality of cooling conduits in thermal communication with the plurality of batteries, where the heat transfer fluid flows through the plurality of cooling conduits. A supplemental electric heater may be configured to heat the heat transfer fluid within the battery thermal control loop when electrical power is connected to the heater.

In another aspect, the system may include (i) a refrigerant-based thermal control loop comprised of a refrigerant, a compressor, and a condenser/evaporator; (ii) a refrigerant-air heat exchanger coupled to the refrigerant-based thermal control loop by a first expansion valve, where the refrigerant-air heat exchanger is thermally coupled to a vehicle HVAC system; and (iii) a refrigerant-fluid heat exchanger coupled to the refrigerant-based thermal control loop by a second expansion valve, where the refrigerant-fluid heat exchanger is thermally coupled to a battery thermal control loop.

In another aspect, the system may include (i) a first temperature sensor coupled to the primary drive train component, where the first temperature sensor outputs a first sensor signal representative of a primary drive train component temperature; (ii) a second temperature sensor coupled to the secondary drive train component, where the second temperature sensor outputs a second sensor signal representative of a secondary drive train component temperature; and (iii) a controller coupled to the first and second temperature sensors, where the controller manipulates the first and second valve assemblies in response to the first and second sensor signals. The system may further include an ambient temperature sensor, where the controller manipulates the first and second valve assemblies in response to the first and second sensor signals and in response to the ambient temperature.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, integers, steps, operations, elements, and/or components, but do not preclude the presence or addition of one or more other features, integers, steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations or components, these steps, calculations or components should not be limited by these terms, rather these terms are only used to distinguish one step, calculation or component from another. For example, a first calculation could be termed a second calculation, similarly, a first step could be termed a second step, similarly, a first component could be termed a second component, all without departing from the scope of this disclosure.

The cooling systems described and illustrated herein are generally designed for use in a vehicle using an electric motor, e.g., an electric vehicle. In the following text, the terms "electric vehicle" and "EV" may be used interchangeably and may refer to an all-electric vehicle, a plug-in hybrid vehicle, also referred to as a PHEV, or a hybrid vehicle, also referred to as a HEV, where a hybrid vehicle utilizes multiple sources of propulsion including an electric drive system. The term "battery pack" as used herein refers to an assembly of one or more batteries electrically interconnected to achieve the desired voltage and capacity, where the battery assembly is typically contained within an enclosure.

Figure 1:
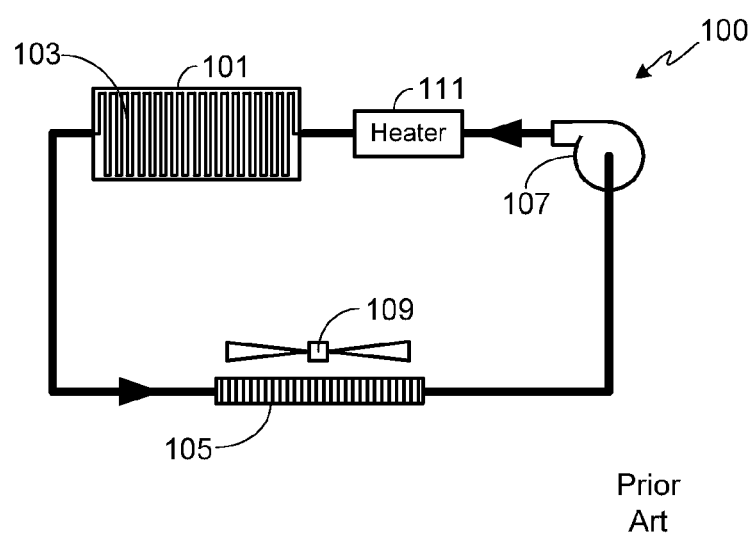
FIG. 1 illustrates an exemplary battery pack cooling system in accordance with the prior art.

In some EVs the only component that is coupled to an active thermal management system, other than the passenger cabin which is coupled to a heating, ventilation and air conditioning (HVAC) system, is the battery pack. FIG. 1 illustrates an exemplary battery thermal management system 100 in accordance with the prior art. In system 100, the temperature of the batteries within battery pack 101 is controlled by pumping a thermal transfer medium, e.g., a liquid coolant, through a plurality of cooling conduits 103 integrated into battery pack 101. Battery pack 101 includes at least one, and typically a plurality of batteries (e.g., tens, hundreds, or thousands of batteries), contained within a battery pack enclosure. The batteries within pack 101 may utilize any of a variety of form-factors, although in at least one conventional configuration the batteries are cylindrically-shaped, for example utilizing an 18650 form-factor, and are positioned within the battery pack so that the cylindrical axis of each battery is substantially perpendicular to the lower battery pack enclosure panel as well as the surface of the road. Conduits 103, which are fabricated from a material with a relatively high thermal conductivity, are positioned within pack 101 in order to optimize thermal communication between the individual batteries, not shown, and the conduits, thereby allowing the temperature of the batteries to be regulated by regulating the flow of coolant within conduits 103 and/or regulating the transfer of heat from the coolant to another temperature control system. Conduits 103 may be located between adjacent batteries within the battery pack, or aligned with the battery pack's lower panel such that the coolant within the conduits flows in a direction substantially perpendicular to the axes of the cylindrical batteries. In the illustrated embodiment, the coolant within conduits 103 is pumped through a radiator 105 using a pump 107. A blower fan 109 may be used to force air through radiator 105, for example when the car is stationary or moving at low speeds, thus insuring that there is an adequate transfer of thermal energy from the coolant to the ambient environment. System 100 may also include an electric heater 111, e.g., a PTC heater, that will heat the coolant within conduits 103 when electric power is supplied to the heater, thereby heating the batteries within pack 101.

Figure 2:
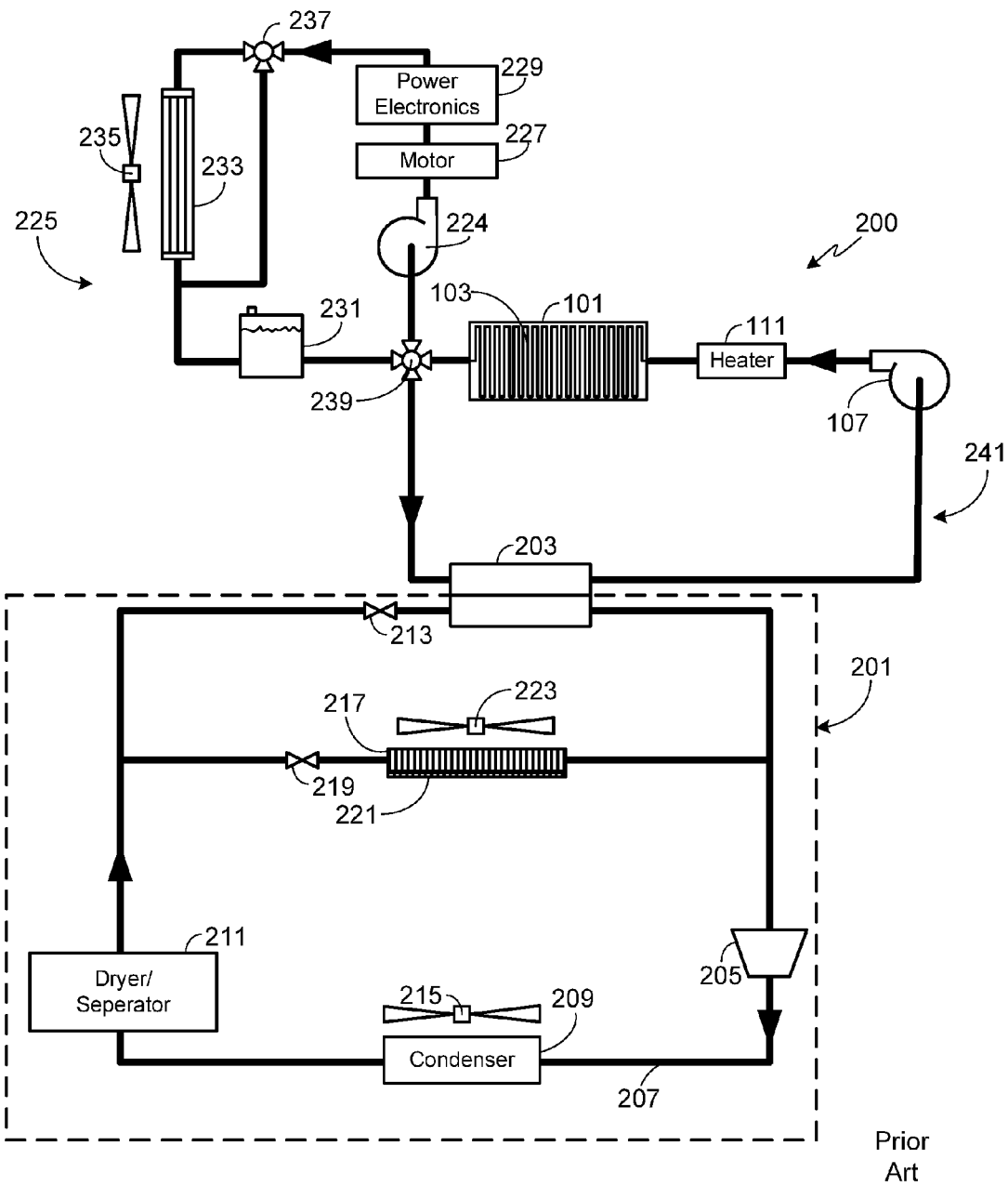
FIG. 2 illustrates an alternate thermal management system in accordance with the prior art.

FIG. 2 illustrates an alternate thermal management system 200 in accordance with the prior art that is capable of regulating the temperature of more vehicle systems than system 100. In system 200 the coolant within conduits 103 is coupled to a secondary thermal management system 201 via a heat exchanger 203. Preferably thermal management system 201 is a refrigeration system and as such, includes a compressor 205 to compress the low temperature vapor in refrigerant line 207 into a high temperature vapor and a condenser 209 in which a portion of the captured heat is dissipated. After passing through condenser 209, the refrigerant changes phases from vapor to liquid, the liquid remaining at a temperature below the saturation temperature at the prevailing pressure. The refrigerant then passes through a dryer 211 that removes moisture from the condensed refrigerant. After dryer 211, refrigerant line 207 is coupled to heat exchanger 203 via thermal expansion valve 213 which controls the flow rate of refrigerant into heat exchanger 203. Additionally, in the illustrated system a blower fan 215 is used in conjunction with condenser 209 to improve system efficiency.

In a typical vehicle configuration, thermal management system 201 is also coupled to the vehicle's heating, ventilation and air conditioning (HVAC) system. In such a system, in addition to coupling refrigerant line 207 to heat exchanger 203, line 207 may also be coupled to the HVAC evaporator 217. A thermal expansion valve 219 is preferably used to control refrigerant flow rate into the evaporator. A heater, for example a PTC heater 221 integrated into evaporator 217, may be used to provide warm air to the passenger cabin. In a conventional HVAC system, one or more fans 223 are used to circulate air throughout the passenger cabin, where the circulating air may be ambient air, air cooled via evaporator 217, or air heated by heater 221.

In addition to providing thermal control over the battery pack, the thermal control system used in some electric vehicles also provides thermal control over the vehicle's drive train. Although drive train thermal control may be accomplished in a separate and completely independent thermal control loop, typically the drive train thermal control loop is coupled to the other control loops, e.g., the passenger cabin and battery thermal control loops, thereby providing enhanced thermal management efficiency and functionality. The control loops may use any of a variety of different heat transfer fluids, both water-based and non-water-based, although preferably the heat transfer fluid is a water-based fluid, e.g., pure water or water that includes an additive such as ethylene glycol or propylene glycol.

In a conventional EV thermal management system in which components of the drive train are temperature controlled, the motor is typically considered to be the primary drive train component of concern even if other drive train components (e.g., gearbox assembly, power electronics such as the inverter, etc.) are also coupled to the thermal control system. When multiple drive train components are under active thermal management, typically the components are integrated into the drive train thermal control loop in series, with the motor being the first component to be cooled. Such a configuration is illustrated in FIG. 2 where thermal control loop 225 is thermally coupled to the drive train, and more specifically to the propulsion motor(s) 227. Motor(s) 227 is typically a three phase alternating current (i.e., AC) motor. In the illustrated system, after passing through motor 227 the control loop 225 is then thermally coupled to power inverter 229. Power inverter 229 converts the direct current (i.e., DC) power from battery pack 101 to match the power requirements of the propulsion motor(s).

Within drive train thermal control loop 225 the heat transfer fluid is circulated using coolant pump 224. Preferably coolant pump 224 is capable of circulating the heat transfer fluid within the control loop at a flow rate of at least 15 liters per minute (lpm), both when control loop 225 is operated independently of the other thermal circuits and when control loop 225 is coupled to another control loop as described below. Thermal control loop 225 also includes a coolant reservoir 231. Preferably reservoir 231 is a high by-pass reservoir that not only de-aerates the coolant within the control loop, but also provides a convenient means for adding coolant to the system.

In order to passively cool the components that are thermally coupled to drive train control circuit 225, components such as the motor and power inverter, the coolant is circulated through a radiator 233. If there is insufficient air flow through radiator 233 to provide the desired level of passive cooling, for example when the vehicle is stopped or driving at slow speeds, a fan 235 may be used to force air through the radiator. Preferably the control loop also includes a valve 237, also referred to herein as a diverter valve, that allows radiator 233 to be decoupled, or partially decoupled, from loop 225. The system may also include, as shown, a four way valve 239 that can be used to serially combine the battery pack thermal control loop 241 with the drive train thermal control loop 225, or to decouple the battery pack thermal control loop 241 from the drive train thermal control loop 225, thereby causing the battery pack thermal control loop 241 to operate in parallel with and independently of the drive train thermal control loop 225.

As noted above, in a conventional thermal control system that is used to cool the drive train, the motor is the primary component of concern followed by cooling of the associated power electronics (e.g., the inverter, DC/DC converter, etc.) and/or the gearbox assembly. In those instances when the system is used to cool multiple drive train components, the system is first thermally coupled to the motor and then to the other drive train components. While this approach will generally provide adequate cooling for all of the thermally coupled drive train components, the inventor has found that in some instances the conventional approach does not provide optimal thermal efficiency. For example, while the conventional approach typically provides acceptable cooling levels when the vehicle is being driven at a continuous high speed (e.g., highway operation), if the driver is drag racing their car then the power electronics, i.e., the power inverter, may be the primary drive train component that is likely to suffer from over-heating. Accordingly, the inventor has found that rather than fixing the order of cooling within the drive train, it is important to provide the thermal control system with sufficient flexibility to allow it to optimize drive train cooling and/or heating based on individual component requirements, ambient conditions and vehicle use.

While an EV thermal management system may be configured in a variety of ways, and the configurations shown in FIGS. 1 and 2 are only meant to illustrate two common configurations, FIGS. 3-12 illustrate various embodiments of the invention, each of which is configured to allow the thermal control system to optimize drive train cooling and/or heating. While these embodiments are based on the prior art thermal system shown in FIG. 2, it should be understood that they are equally applicable to other thermal management systems. For example, the embodiments of the invention described below may be used with any of the thermal management systems disclosed in co-assigned U.S. patent application Ser. No. 14/519,182, filed 21 Oct. 2014, the disclosure of which is incorporated herein for any and all purposes. Additionally while the embodiments illustrated in FIGS. 3-12 couple the drive train thermal loop to a motor 227 and power electronics 229, the invention is equally applicable to configurations in which the drive train thermal loop is thermally coupled to motor 227 and an alternate drive train component (e.g., a gearbox assembly). Accordingly, it should be understood that "power electronics 229" within the figures may be replaced by any other secondary drive train component that may benefit from thermal management, such as the gearbox assembly, without departing from the invention.

Figure 3:
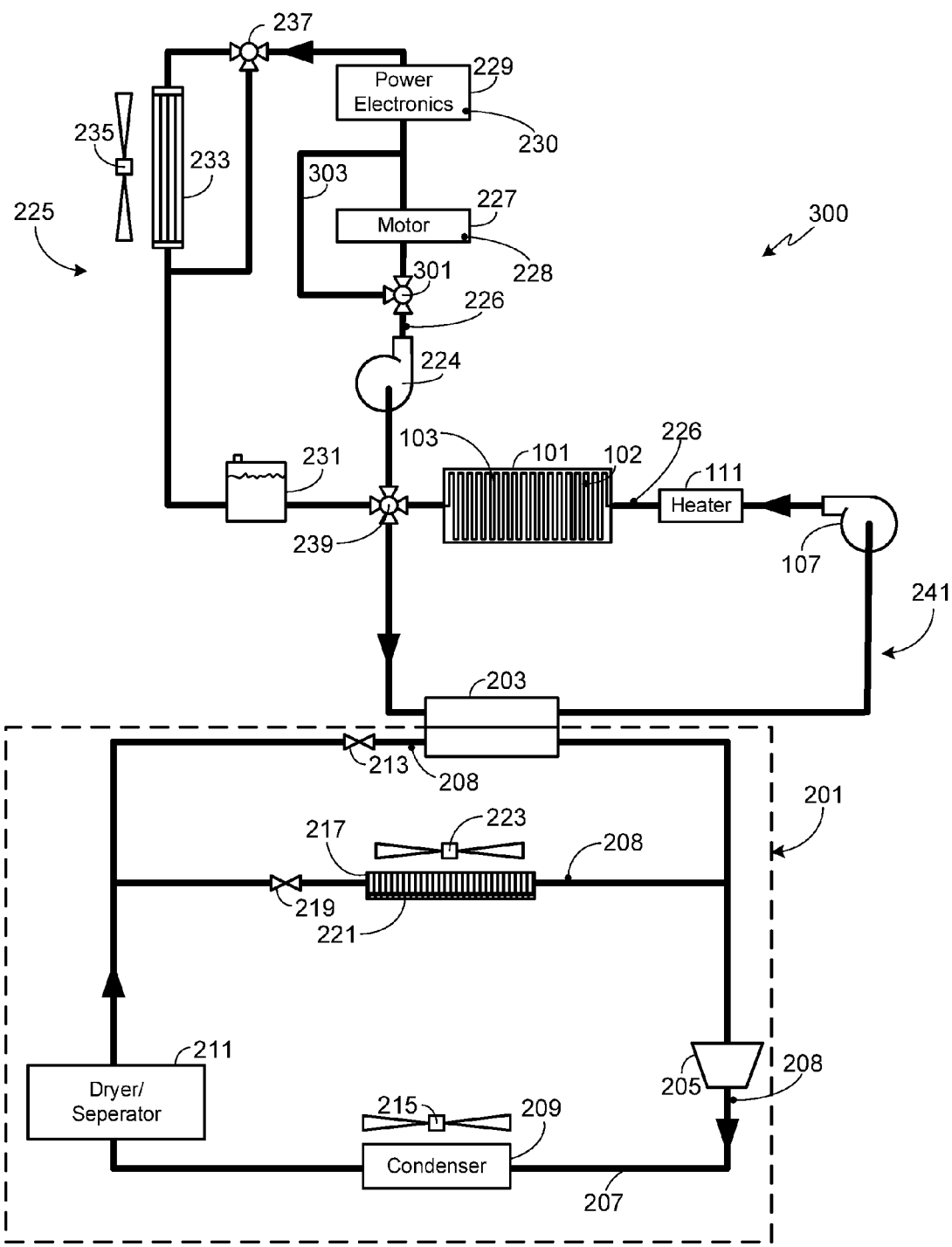
FIG. 3 illustrates a preferred embodiment of the invention that utilizes a valve assembly to control coolant flow through drive train components.

In thermal control system 300 shown in FIG. 3, a valve 301 (e.g., a diverter valve) has been added to drive train control loop 225. Valve 301 allows motor 227 to be decoupled from the thermal control loop, thereby allowing maximum cooling to be applied to power electronics 229 via bypass loop 303. Preferably diverter valve 301 can also be configured to only partially decouple motor 227 from the thermal control loop, thus allowing some of the coolant to provide direct cooling of motor 227, some of the coolant to provide direct cooling of power electronics 229, and some of the coolant to provide indirect cooling of power electronics 229 after first cooling motor 227.

In system 300 there is a slight cooling preference given to motor 227 as it immediately follows valve 301. In this configuration when the valve is only partially closed, some of the coolant is allowed to be thermally affected by motor 227 before this coolant is thermally coupled to power electronics 229. It should be understood that the invention is equally applicable to thermal control systems in which preference is given to the secondary drive train component (e.g., the power electronics). Thus, for example, in the system shown in FIG. 4 when valve 301 is partially closed, a portion of the coolant is thermally coupled to power electronics 229 prior to being thermally coupled to motor 227. Of course in system 400, as with system 300, if desired the coolant can only be thermally coupled to one of the components, i.e., either power electronics 229 in system 300 or motor 227 in system 400.

Figure 4:
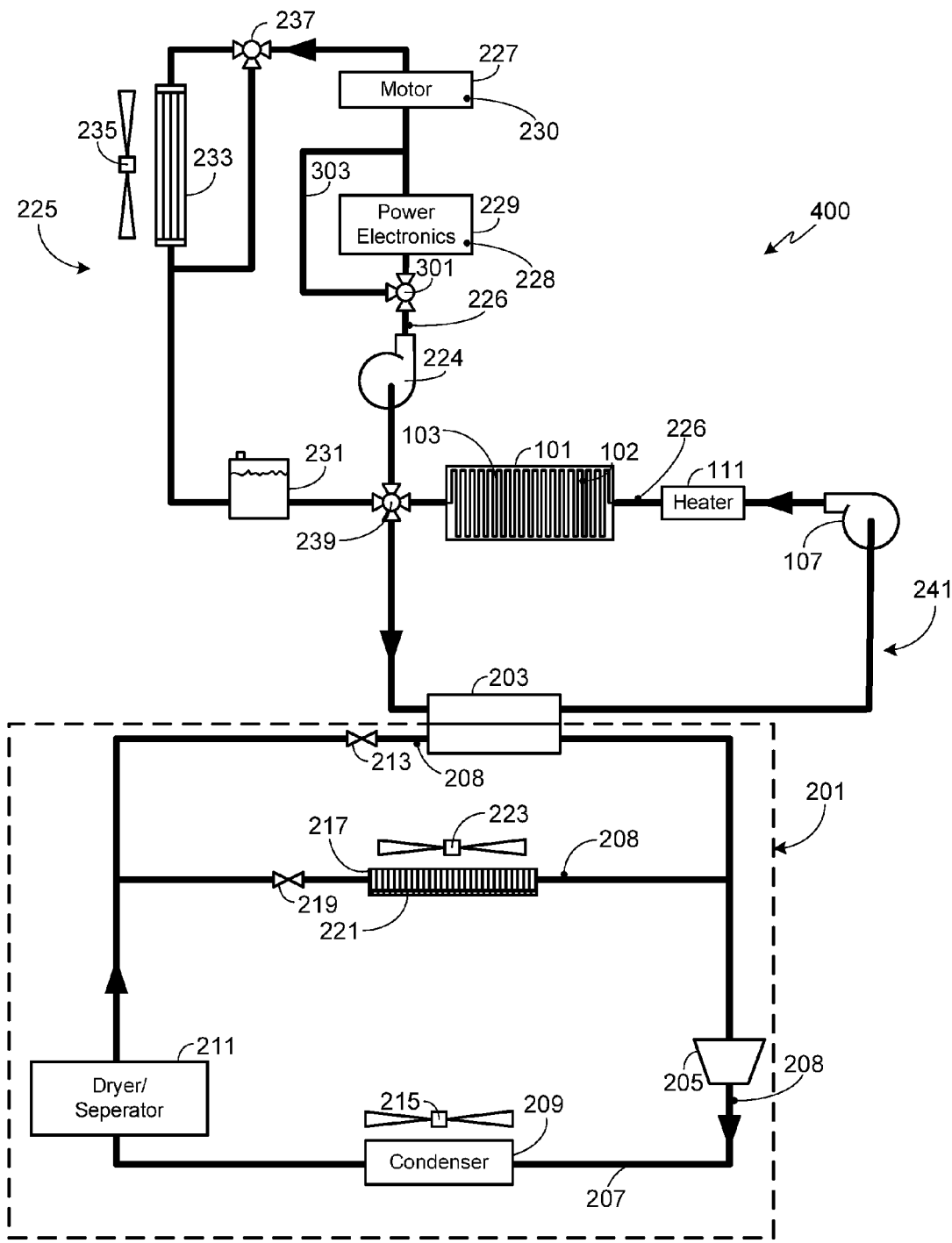
FIG. 4 illustrates a modification of the embodiment shown in FIG. 3 in which the order of drive train components has been reversed within the thermal control loop.

In the embodiments illustrated in FIGS. 3 and 4, if the first drive train component is coupled to the thermal system via valve 301, the coolant that is thermally coupled to this component is automatically thermally coupled to the second component. Thus in system 300, if valve 301 is set to thermally couple some, or all, of the coolant in loop 225 to motor 227, then this coolant will automatically be thermally coupled to power electronics 229. As a result, it is possible that the coolant will be heated by motor 227 to a temperature that is greater than the current temperature of power electronics 229, causing the coolant to actually heat, rather than cool, the power electronics. Similarly when the relative locations of these drive train components in drive train control loop 225 are reversed as in system 400, it is possible that the power electronics may pre-heat the coolant to a temperature that is greater than desired.

Figure 5:
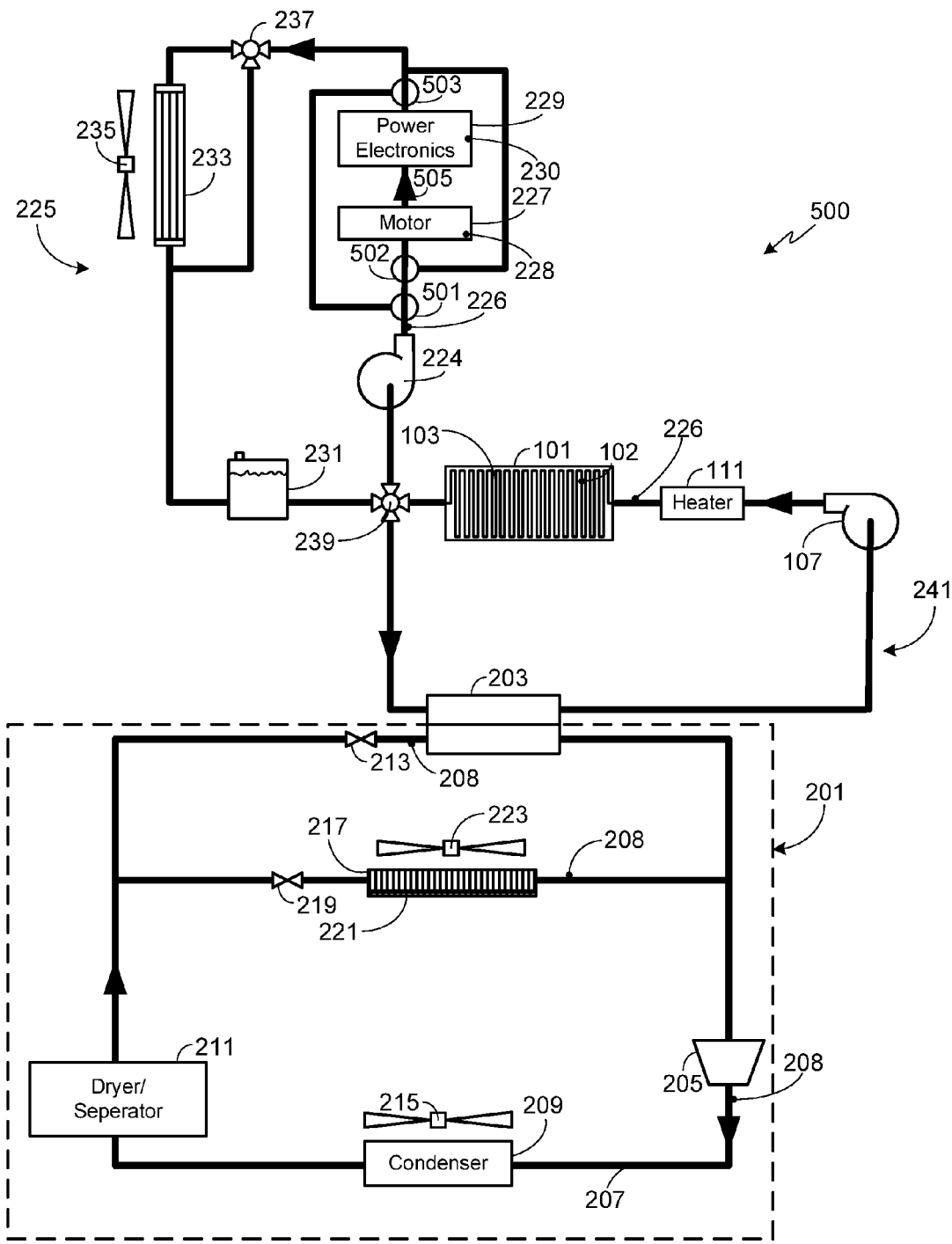
FIG. 5 illustrates a preferred embodiment of the invention that allows the order of component cooling within the drive train to be reversed.
Figure 6:
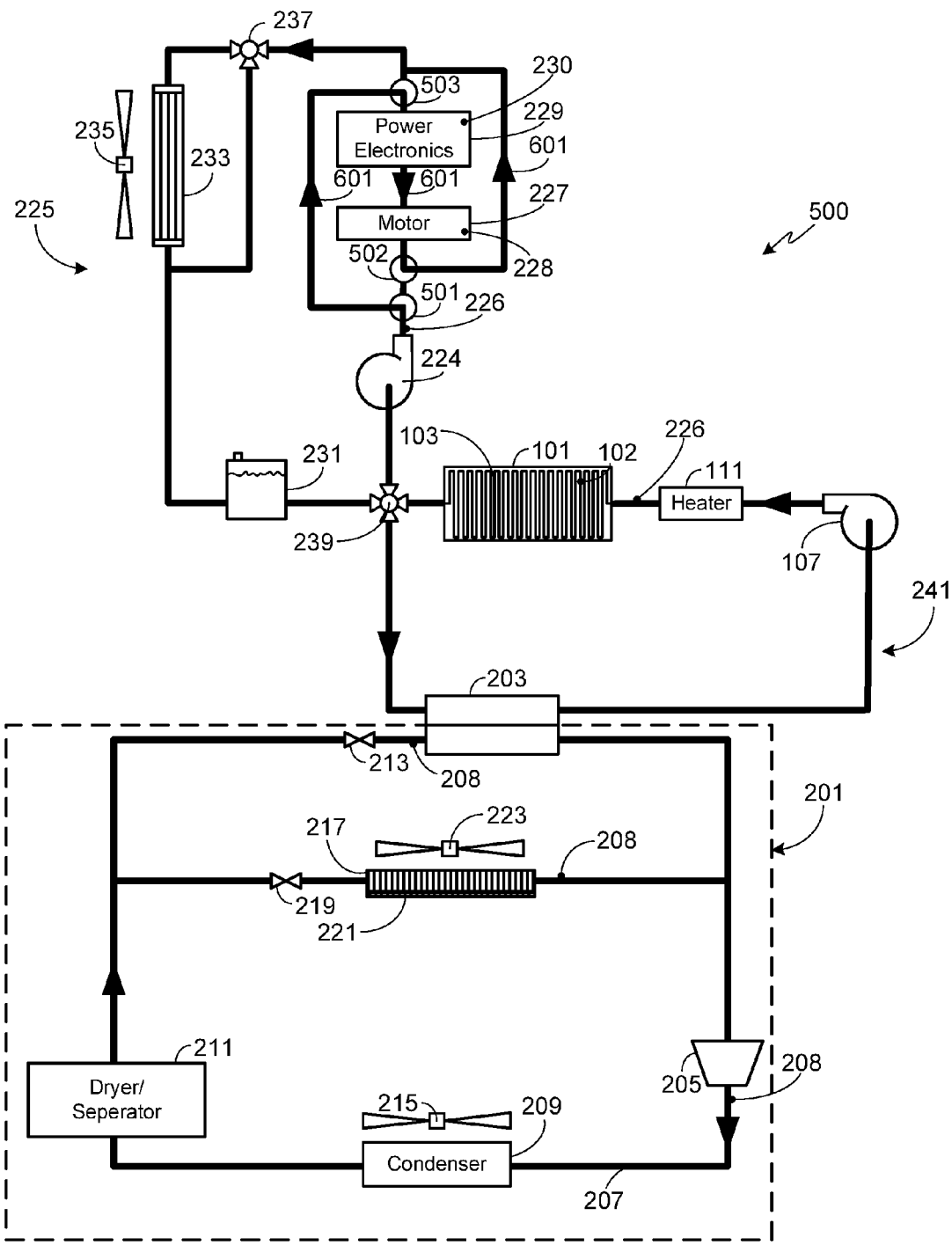
FIG. 6 illustrates the preferred embodiment of FIG. 5, this figure illustrating a reversal of the direction of coolant flow within the drive train from that shown in FIG. 5.
Figure 7:
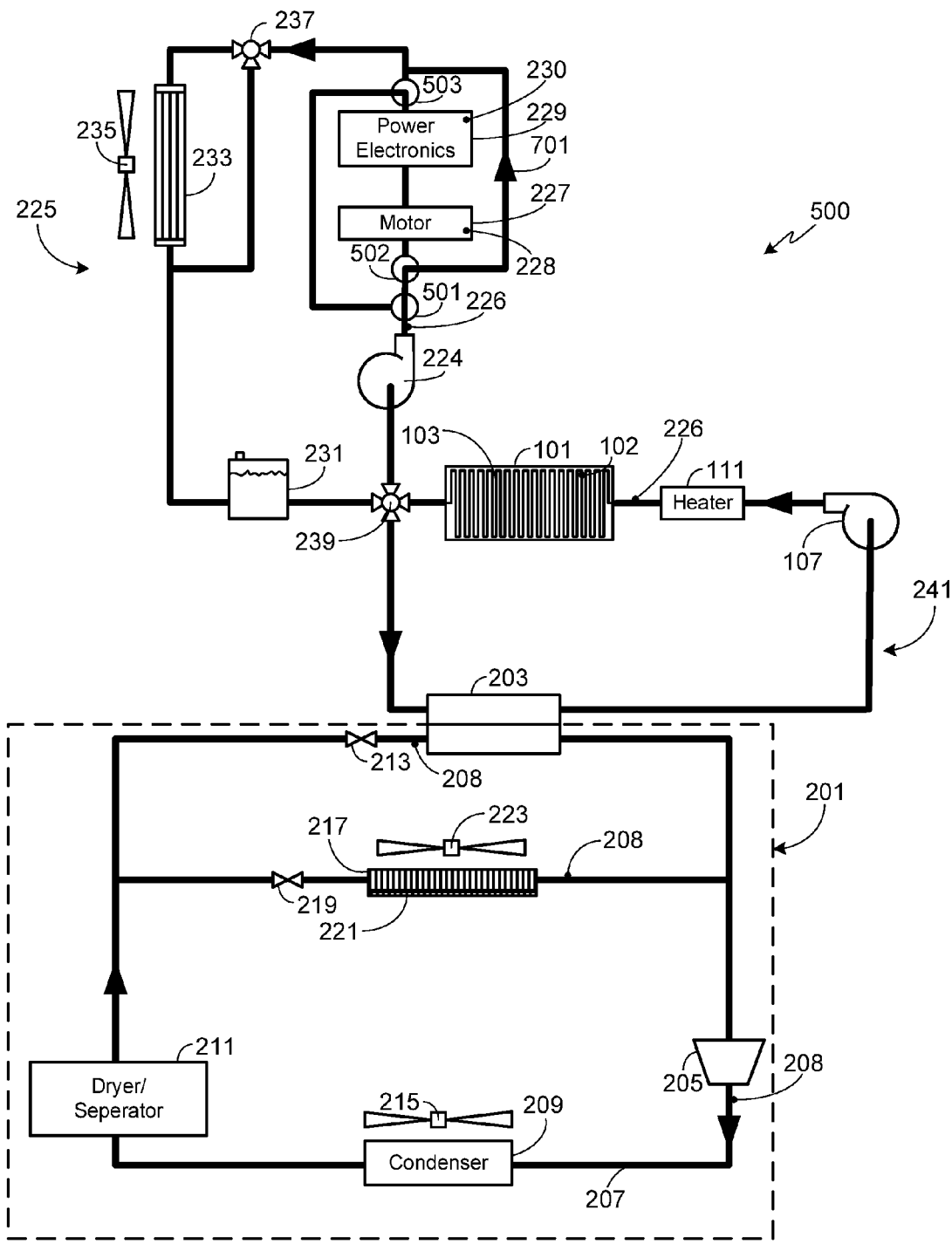
FIG. 7 illustrates a slight modification of the embodiment shown in FIG. 5 that not only allows a reversal of coolant flow within the drive train, but also allows the drive train components to be completely decoupled from the drive train thermal control loop.
Figure 8:
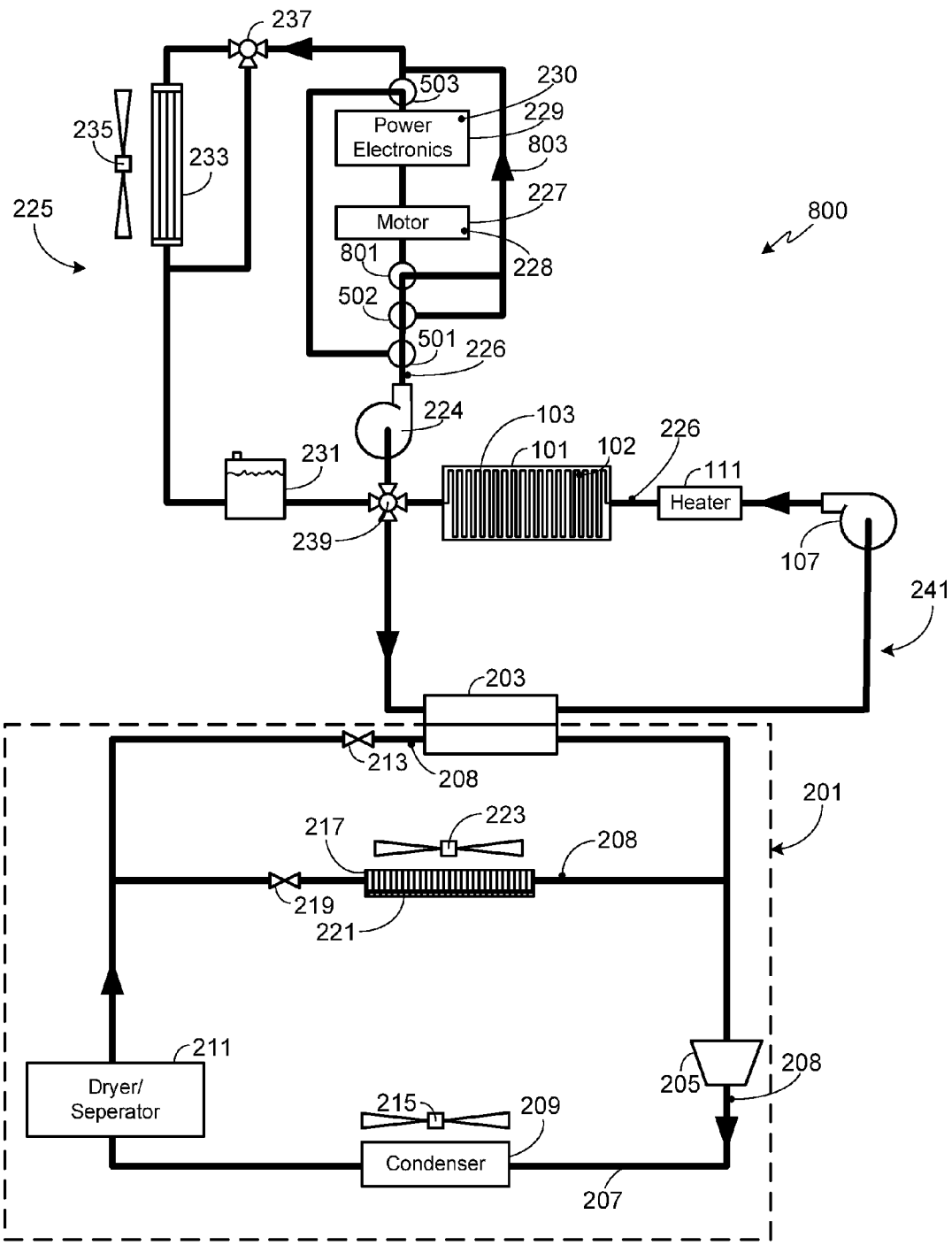
FIG. 8 illustrates an embodiment, similar to that shown in FIG. 7, with the inclusion of an additional valve that not only allows a reversal of coolant flow within the drive train, but also allows the drive train components to be completely decoupled from the drive train thermal control loop.
Figure 9:
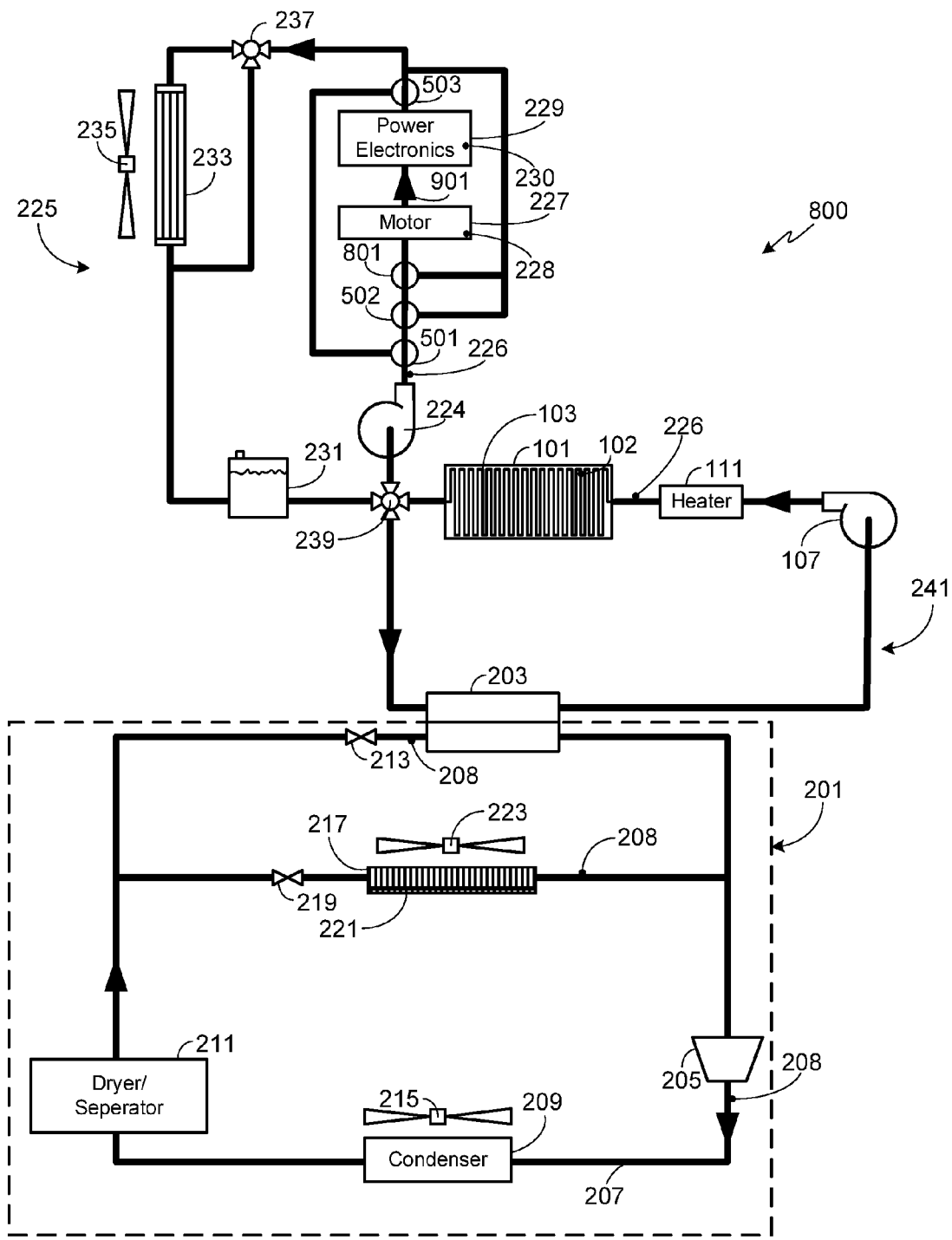
FIG. 9 illustrates the embodiment shown in FIG. 8, with the valves set to provide drive train cooling with the motor cooled prior to the power electronics.
Figure 10:
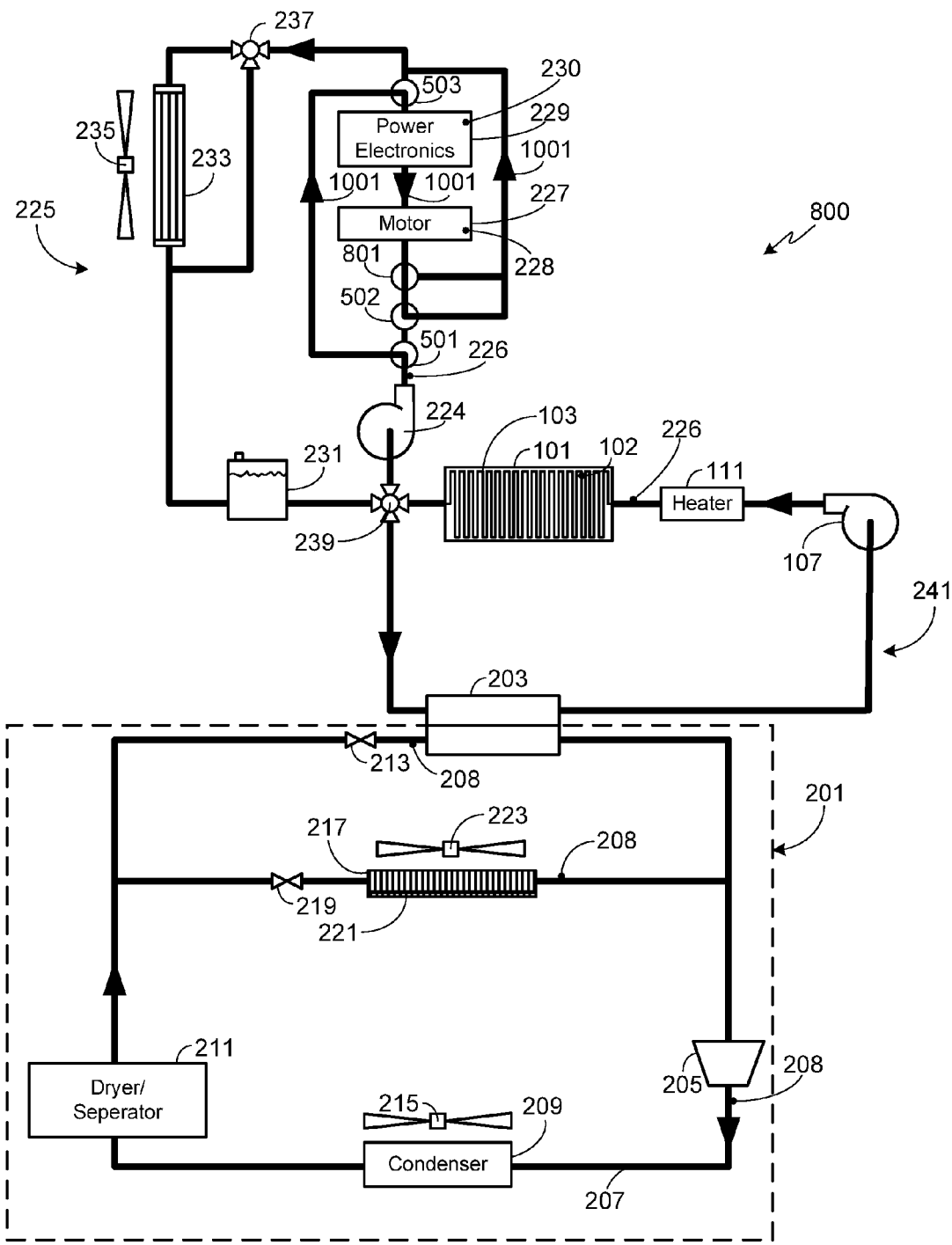
FIG. 10 illustrates the embodiment shown in FIG. 8, with the valves set to provide drive train cooling with the power electronics cooled prior to the motor.

In order to take advantage of the pre-heating of the coolant by the first drive train component, or to minimize the effects of coolant preheating on the second drive train component, in the thermal control system shown in FIGS. 5 and 6 a set of valves 501-503 is used to determine the direction of flow through motor 227 and the secondary drive train component (e.g., power electronics 229). Thus when the valves are set as indicated in FIG. 5, the direction of flow follows pathway 505. As a result of these valve settings, coolant within drive train loop 225 is thermally coupled to motor 227 before being thermally coupled to power electronics 229. When the positions of valves 501-503 are altered as shown in FIG. 6, the coolant follows pathway 601 and therefore is thermally coupled to power electronics 229 before being thermally coupled to motor 227. Note that by changing the functionality of valve 502 as shown in FIG. 7, or by adding a diverter valve 801 as shown in FIG. 8, the valve set-up can also be used to decouple, or partially decouple, all drive train components from the thermal control loop. Thus as shown in FIGS. 7 and 8 with the valves set as shown the coolant follows pathways 701 and 803, respectively, thereby completely isolating the drive train components from the thermal control loop. For clarity, FIGS. 9 and 10 illustrate system 800 with the valves set to thermally couple motor 227 before power electronics 229 (e.g., pathway 901) and to thermally couple power electronics 229 before motor 227 (e.g., pathway 1001), respectively.

Figure 11:
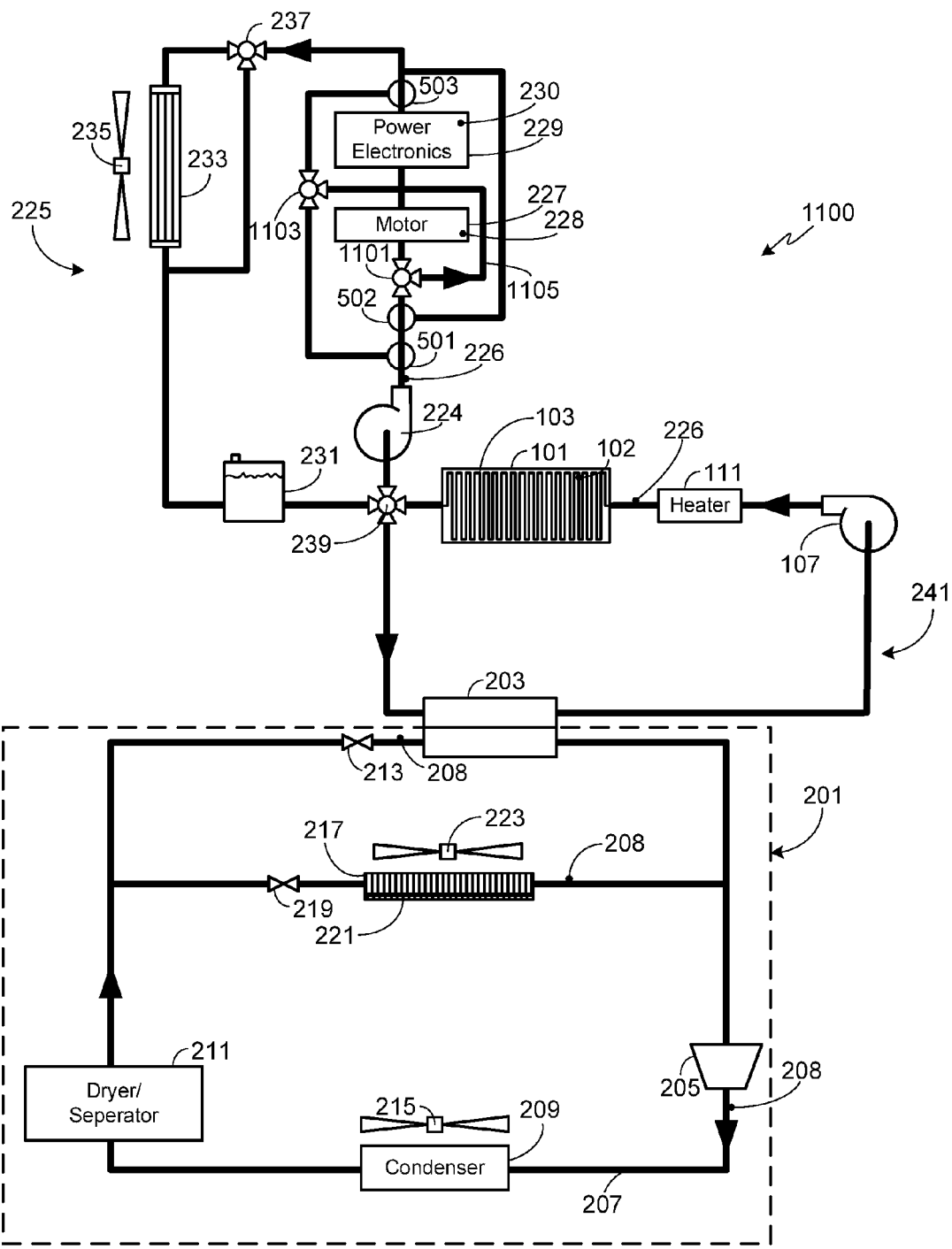
FIG. 11 illustrates an alternate preferred embodiment of the invention that allows (i) a reversal of coolant flow within the drive train and (ii) selective decoupling, partial or complete, of either drive train component from the drive train thermal control loop.
Figure 12:
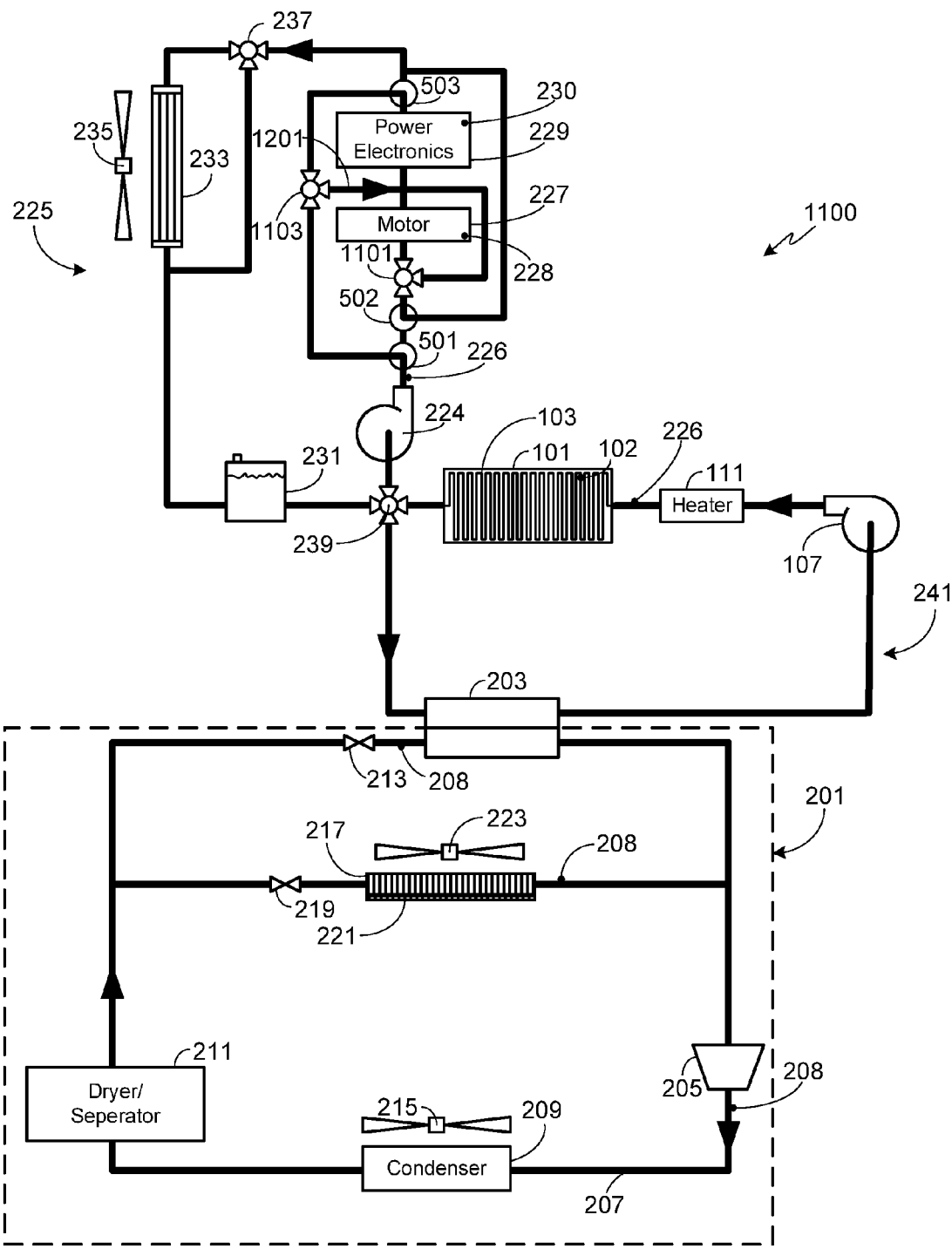
FIG. 12 illustrates the embodiment shown in FIG. 11, modified to alter the direction of coolant flow within the drive train thermal control loop.

In some vehicle applications the inventor has found that a combination of the configurations shown in FIGS. 4-6 is preferred, thus not only providing means for determining the coolant flow direction through the drive components as in system 500, but also providing means for completely or partially decoupling one of the drive train components from the coolant loop as in systems 300 and 400. An exemplary configuration based on this combination is shown in FIGS. 11 and 12 in which a pair of valves (e.g., diverter valves) 1101/1103 has been added to the drive train thermal control loop. As shown in FIG. 11, valves 501-503 are configured to provide cooling to motor 227 prior to power electronics 229 as previously shown in FIG. 5. Additionally, valve 1101 allows the system to decouple, or partially decouple, motor 227 from the thermal control loop following coolant pathway 1105. In FIG. 12 valves 501-503 are configured in the same manner as shown in FIG. 6, thereby providing cooling to power electronics 229 prior to motor 227. In this configuration valve 1103 can be used to partially or completely decouple power electronics 229 from the thermal control loop following coolant pathway 1201. It will be appreciated that in some vehicles, based on assumed ambient conditions and vehicle design, it may not be necessary to utilize the entire valve set-up shown in FIGS. 11 and 12. For example, only one of the diverter valves 1101/1103 may be required, depending upon intended system usage.

Figure 13:
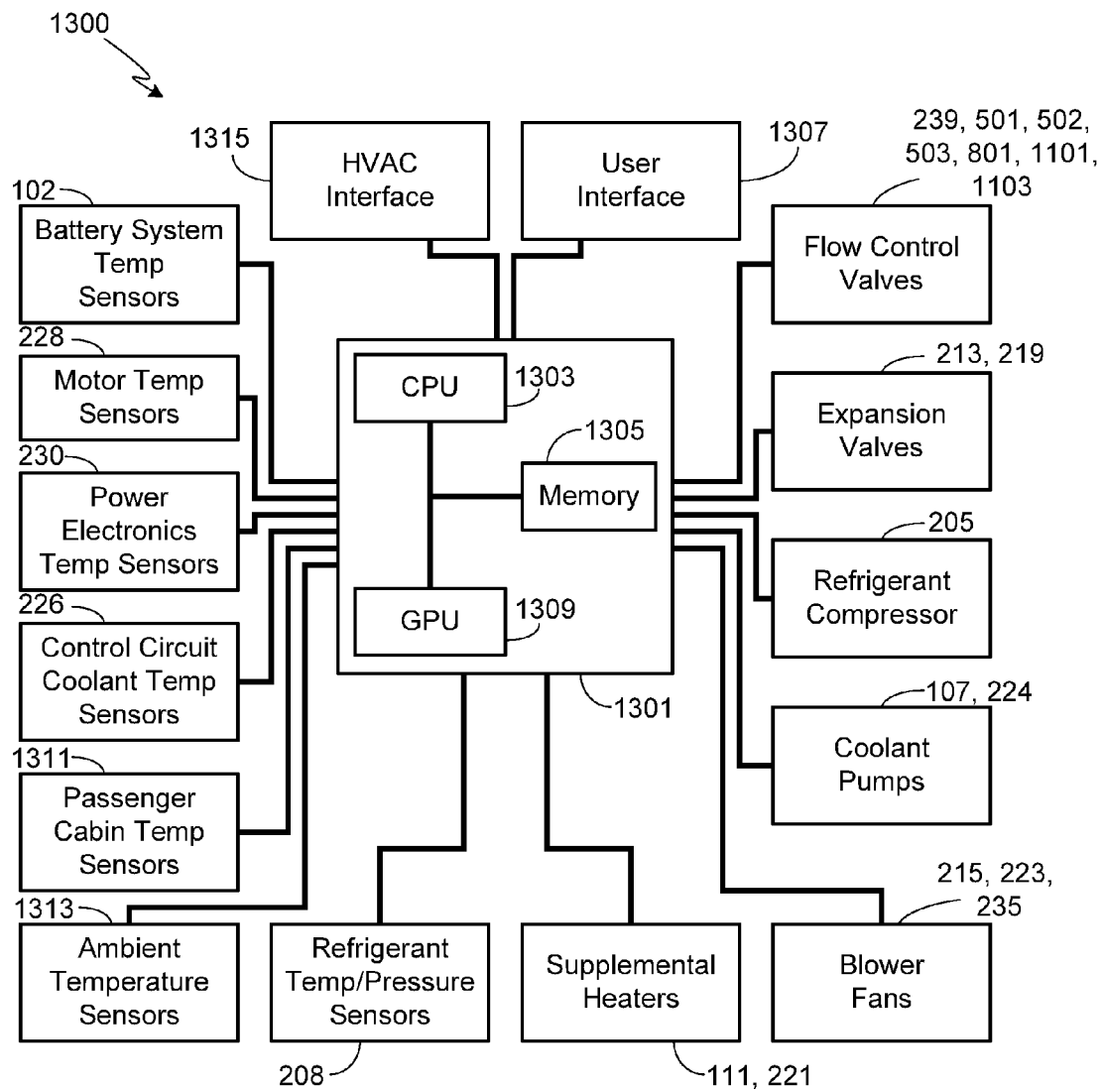
FIG. 13 provides a block diagram of an exemplary control system for use with the thermal management system shown in FIGS. 3-12.

FIG. 13 is a block diagram of an exemplary control system 1300 for use with a thermal management system such as those shown in FIGS. 3-12. The control system provides automatic optimization of the thermal system, allowing efficient maintenance of individual drive train components within their preferred operating range. Control system 1300 includes a system controller 1301. System controller 1301 may be the same controller used to perform other vehicle functions, i.e., system controller 1301 may be a vehicle system controller that may be used to control any of a variety of vehicle subsystems, e.g., navigation system, entertainment system, suspension (e.g., air suspension), battery charging, vehicle performance monitors, etc. Alternately, system controller 1301 may be separate from the vehicle's system controller and dedicated to controlling, and optimizing the performance of, the thermal management system. System controller 1301 includes a central processing unit (CPU) 1303 and a memory 1305. Memory 1305 may be comprised of EPROM, EEPROM, flash memory, RAM, a solid state disk drive, a hard disk drive, or any other memory type or combination of memory types. Memory 1305 may be used to store preferred operating temperature ranges for battery pack 101, motor 227 and power electronics 229. If the vehicle uses a touch-screen or similar display means 1307 as the user interface, controller 1301 may also include a graphical processing unit (GPU) 1309. CPU 1303 and GPU 1309 may be separate or contained on a single chip set.

Coupled to controller 1301 are a plurality of temperature sensors that monitor the temperatures of various components and subsystems under the control of the thermal control system. For example, battery pack 101 may include one or more temperature sensors 102 that monitor battery pack temperature, motor(s) 227 may include one or more temperature sensors 228 that monitor motor temperature, and power electronics 229 may include one or more temperature sensors 230 that monitor power electronics temperature. The temperature of the heat transfer fluid within one or more of the thermal control loops, e.g., drive train loop 225 and battery pack thermal control loop 241, may also be monitored using temperature sensors 226. Temperature/pressure sensors 208 are also preferably used to monitor the state of the refrigerant in thermal control loop 207. Lastly, the temperature within the passenger cabin (sensor 1311) and the ambient temperature (sensor 1313) may also be monitored. Also coupled to controller 1301 is a HVAC system interface 1315 that allows the desired passenger cabin temperature to be set by the driver and/or passengers, where the desired temperature may be configured to either be set by zone or a single temperature for the entire cabin. The HVAC system interface 1315 may be a HVAC dedicated interface, e.g., temperature control switches mounted within the passenger cabin, or may utilize a common user interface such as display interface 1307.

As described above, the thermal control system of the invention uses a variety of valves and other components to maintain each of the vehicle's subsystems (e.g., battery pack, drive train components, passenger cabin, etc.) within their desired temperature range while optimizing overall system efficiency. Accordingly, coupled to and controlled by controller 1301 are flow control valves 239, 501, 502, 503, 801, 1101 and 1103; expansion valves 213 and 219; compressor 205; heat transfer fluid circulating pumps 107 and 224; blower fans 215, 223 and 235; and heaters 111 and 221.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A multi-mode vehicle drive train thermal management system, comprising:
   a drive train thermal control loop comprising a first circulation pump, wherein said first circulation pump circulates a heat transfer fluid within said drive train thermal control loop, and wherein said drive train thermal control loop is thermally coupled to a primary drive train component and to a secondary drive train component;
   a first valve assembly coupled to said drive train thermal control loop, wherein said first valve assembly in a first operational mode thermally couples said drive train thermal control loop to said primary drive train component and to said secondary drive train component in series, wherein when said first valve assembly is in said first operational mode said drive train thermal control loop is thermally coupled first to said primary drive train component and second to said secondary drive train component, wherein said first valve assembly in a second operational mode thermally couples said drive train thermal control loop to said secondary drive train component and to said primary drive train component in series, wherein when said first valve assembly is in said second operational mode said drive train thermal control loop is thermally coupled first to said secondary drive train component and second to said primary drive train component; and
   a second valve assembly coupled to said drive train thermal control loop, wherein when said first valve assembly is in said first operational mode and said second valve assembly is in a third operational mode said drive train thermal control loop is thermally coupled first to said primary drive train component and second to said secondary drive train component, and wherein when said first valve assembly is in said first operational mode and said second valve assembly is in a fourth operational mode said drive train thermal control loop is thermally decoupled from said primary drive train component and said heat transfer fluid is allowed to by-pass said primary drive train component, and wherein when said first valve assembly is in said first operational mode and said second valve assembly is in said fourth operational mode said drive train thermal control loop is thermally coupled to said secondary drive train component.

2. The multi-mode vehicle drive train thermal management system of claim 1, wherein when said first valve assembly is in said first operational mode and said second valve assembly is in a fifth operational mode a first portion of said heat transfer fluid is thermally coupled to said primary drive train component and to said secondary drive train component in series, and wherein when said first valve assembly is in said first operational mode and said second valve assembly is in said fifth operational mode a second portion of said heat transfer fluid is allowed to by-pass said primary drive train component, and wherein when said first valve assembly is in said first operational mode and said second valve assembly is in said fifth operational mode said second portion of said heat transfer fluid is thermally coupled to said secondary drive train component.

3. The multi-mode vehicle drive train thermal management system of claim 1, further comprising a third valve assembly coupled to said drive train thermal control loop, wherein when said first valve assembly is in said second operational mode and said third valve assembly is in a sixth operational mode said drive train thermal control loop is thermally coupled first to said secondary drive train component and second to said primary drive train component, and wherein when said first valve assembly is in said second operational mode and said second valve assembly is in a seventh operational mode said drive train thermal control loop is thermally decoupled from said secondary drive train component and said heat transfer fluid is allowed to by-pass said secondary drive train component, and wherein when said first valve assembly is in said second operational mode and said second valve assembly is in said seventh operational mode said drive train thermal control loop is thermally coupled to said primary drive train component.

4. The multi-mode vehicle drive train thermal management system of claim 3, wherein when said first valve assembly is in said second operational mode and said third valve assembly is in an eighth operational mode a first portion of said heat transfer fluid is thermally coupled to said secondary drive train component and to said primary drive train component in series, and wherein when said first valve assembly is in said second operational mode and said third valve assembly is in said eighth operational mode a second portion of said heat transfer fluid is allowed to by-pass said secondary drive train component, and wherein when said first valve assembly is in said second operational mode and said third valve assembly is in said eighth operational mode said second portion of said heat transfer fluid is thermally coupled to said primary drive train component.

5. The multi-mode vehicle drive train thermal management system of claim 1, wherein said primary drive train component is comprised of a vehicle propulsion motor and said secondary drive train component is comprised of a power electronics subsystem.

6. The multi-mode vehicle drive train thermal management system of claim 5, wherein said power electronics subsystem is comprised of an inverter.

7. The multi-mode vehicle drive train thermal management system of claim 1, wherein said primary drive train component is comprised of a vehicle propulsion motor and said secondary drive train component is comprised of a gear box assembly.

8. The multi-mode vehicle drive train thermal management system of claim 1, wherein said heat transfer fluid is selected from the group consisting of water and water containing an additive.

9. The multi-mode vehicle drive train thermal management system of claim 8, wherein said additive is selected from the group consisting of ethylene glycol and propylene glycol.

10. The multi-mode vehicle drive train thermal management system of claim 1, further comprising a coolant reservoir, wherein said heat transfer fluid within said drive train thermal control loop flows into and out of said coolant reservoir.

11. The multi-mode vehicle drive train thermal management system of claim 1, further comprising a radiator coupled to said drive train thermal control loop.

12. The multi-mode vehicle drive train thermal management system of claim 11, further comprising a fan configured to force air through said radiator.

13. The multi-mode vehicle drive train thermal management system of claim 11, further comprising a diverter valve, wherein said diverter valve in a first position couples said radiator to said drive train thermal control loop and allows at least a portion of said heat transfer fluid to flow through said radiator, and wherein said diverter valve in a second position decouples said radiator from said drive train thermal control loop and allows said heat transfer fluid within said drive train thermal control loop to by-pass said radiator.

14. The multi-mode vehicle drive train thermal management system of claim 13, wherein said diverter valve in said first position allows a second portion of said heat transfer fluid to by-pass said radiator, and wherein said diverter valve in a third position couples said radiator to said drive train thermal control loop and allows said heat transfer fluid to flow through said radiator while preventing said second portion of said heat transfer fluid from bypassing said radiator.

15. The multi-mode vehicle drive train thermal management system of claim 1, further comprising:
  a battery thermal control loop comprising a second circulation pump, wherein said second circulation pump circulates said heat transfer fluid within said battery thermal control loop, and wherein said battery thermal control loop is thermally coupled to a vehicle battery pack;
  a fourth valve assembly, wherein said battery thermal control loop operates in parallel with and independent of said drive train thermal control loop when said fourth valve assembly is configured in a fourth valve assembly first mode, and wherein said battery thermal control loop is serially coupled to said drive train thermal control loop when said fourth valve assembly is configured in a fourth valve assembly second mode.

16. The multi-mode vehicle drive train thermal management system of claim 15, said vehicle battery pack comprising a plurality of batteries and a plurality of cooling conduits in thermal communication with said plurality of batteries, wherein said heat transfer fluid within said battery thermal control loop flows through said plurality of cooling conduits.

17. The multi-mode vehicle drive train thermal management system of claim 15, said battery thermal control loop further comprising a supplemental electric heater configured to heat said heat transfer fluid of said battery thermal control loop when electrical power is connected to said supplemental electric heater.

18. The multi-mode vehicle drive train thermal management system of claim 15, further comprising:
  a refrigerant-based thermal control loop, wherein said refrigerant-based thermal control loop is comprised of a refrigerant, a compressor, and a condenser/evaporator;
  a refrigerant-air heat exchanger coupled to said refrigerant-based thermal control loop by a first expansion valve, wherein said refrigerant-air heat exchanger is thermally coupled to a vehicle HVAC system; and
  a refrigerant-fluid heat exchanger coupled to said refrigerant-based thermal control loop by a second expansion valve, wherein said refrigerant-fluid heat exchanger is thermally coupled to said battery thermal control loop.

19. The multi-mode vehicle drive train thermal management system of claim 1, further comprising:
  a first temperature sensor coupled to said primary drive train component, wherein said first temperature sensor outputs a first sensor signal representative of a primary drive train component temperature;
  a second temperature sensor coupled to said secondary drive train component, wherein said second temperature sensor outputs a second sensor signal representative of a secondary drive train component temperature; and
  a controller coupled to said first and second temperature sensors, wherein said controller manipulates said first valve assembly and said second valve assembly in response to said first and second sensor signals.

20. The multi-mode vehicle drive train thermal management system of claim 19, further comprising an ambient temperature sensor, wherein said controller manipulates said first valve assembly and said second valve assembly in response to said first and second sensor signals and in response to an ambient temperature.

* * * * *

UNITED STATES PATENT AND TRADEMARK OFFICE
CERTIFICATE OF CORRECTION

PATENT NO. : 9,844,995 B2  
APPLICATION NO. : 14/698630  
DATED : December 19, 2017  
INVENTOR(S) : Peter Rawlinson Page 1 of 1

It is certified that error appears in the above-identified patent and that said Letters Patent is hereby corrected as shown below:

On the Title Page

Item (54) and in the Specification, Column 1, Line 1, delete "MUTI-MODE" and insert --MULTI-MODE--, therefor.

Signed and Sealed this  
Twentieth Day of July, 2021

Drew Hirshfeld  
*Performing the Functions and Duties of the*  
*Under Secretary of Commerce for Intellectual Property and*  
*Director of the United States Patent and Trademark Office*